United States Patent
Bisht et al.

(10) Patent No.: US 10,757,014 B2
(45) Date of Patent: Aug. 25, 2020

(54) EFFICIENT NAT IN SDN NETWORK

(71) Applicant: Telefonaktiebolaget LM Ericsson (publ), Stockholm (SE)

(72) Inventors: Ashutosh Bisht, Bangalore (IN); Faseela K, Bangalore (IN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/312,003

(22) PCT Filed: Jul. 1, 2016

(86) PCT No.: PCT/IB2016/053991
§ 371 (c)(1),
(2) Date: Dec. 20, 2018

(87) PCT Pub. No.: WO2018/002695
PCT Pub. Date: Jan. 4, 2018

(65) Prior Publication Data
US 2019/0379600 A1    Dec. 12, 2019

(51) Int. Cl.
*H04L 12/28* (2006.01)
*H04L 12/721* (2013.01)
*H04L 29/12* (2006.01)

(52) U.S. Cl.
CPC ............ *H04L 45/38* (2013.01); *H04L 61/256* (2013.01); *H04L 61/2514* (2013.01); *H04L 61/2517* (2013.01)

(58) Field of Classification Search
CPC ...................................... H04L 12/50
USPC ......................................... 370/329
See application file for complete search history.

(56) References Cited

U.S. PATENT DOCUMENTS

| 8,701,179 B1 | 4/2014 | Penno et al. |
| 2015/0071225 A1 | 3/2015 | Krishna et al. |
| 2015/0350156 A1 | 12/2015 | Ma et al. |
| 2019/0173779 A1* | 6/2019 | Gruner .............. G06F 9/45558 |

FOREIGN PATENT DOCUMENTS

WO     2015041706 A8    5/2015

OTHER PUBLICATIONS

Benson, et al., "Network Traffic Characteristics of Data Centers in the Wild," ACM, IMC'10, Nov. 1-3, 2010, Melbourne, Australia, 14 pages.

(Continued)

*Primary Examiner* — Dang T Ton
(74) *Attorney, Agent, or Firm* — Sage Patent Group

(57) ABSTRACT

A method is implemented by a control plane device in a Software Defined Networking (SDN) network to configure a data plane device in the SDN network to perform network address translation (NAT) for a flow so that the flow can bypass a NAT device. The method includes receiving a translation rule for the flow from the NAT device, configuring the data plane device to steer the flow such that the flow bypasses the NAT device, configuring the data plane device to perform NAT for the flow according to the translation rule for the flow, and transmitting an indication to the NAT device that the flow is to bypass the NAT device.

20 Claims, 9 Drawing Sheets

(56) References Cited

OTHER PUBLICATIONS

Networkheresy, "Of Mice and Elephants," Blog Post at WordPress.com, Nov. 1, 2013, downloaded on Dec. 7, 2018 from https://networkheresy.com/2013/11/01/of-mice-and-elephants/, 7 pages.
RFC 791: Postel J., "DARPA Internet Program Protocol Specification," Internet Protocol, Request for comments: 791, Sep. 1981, 50 pages.

* cited by examiner

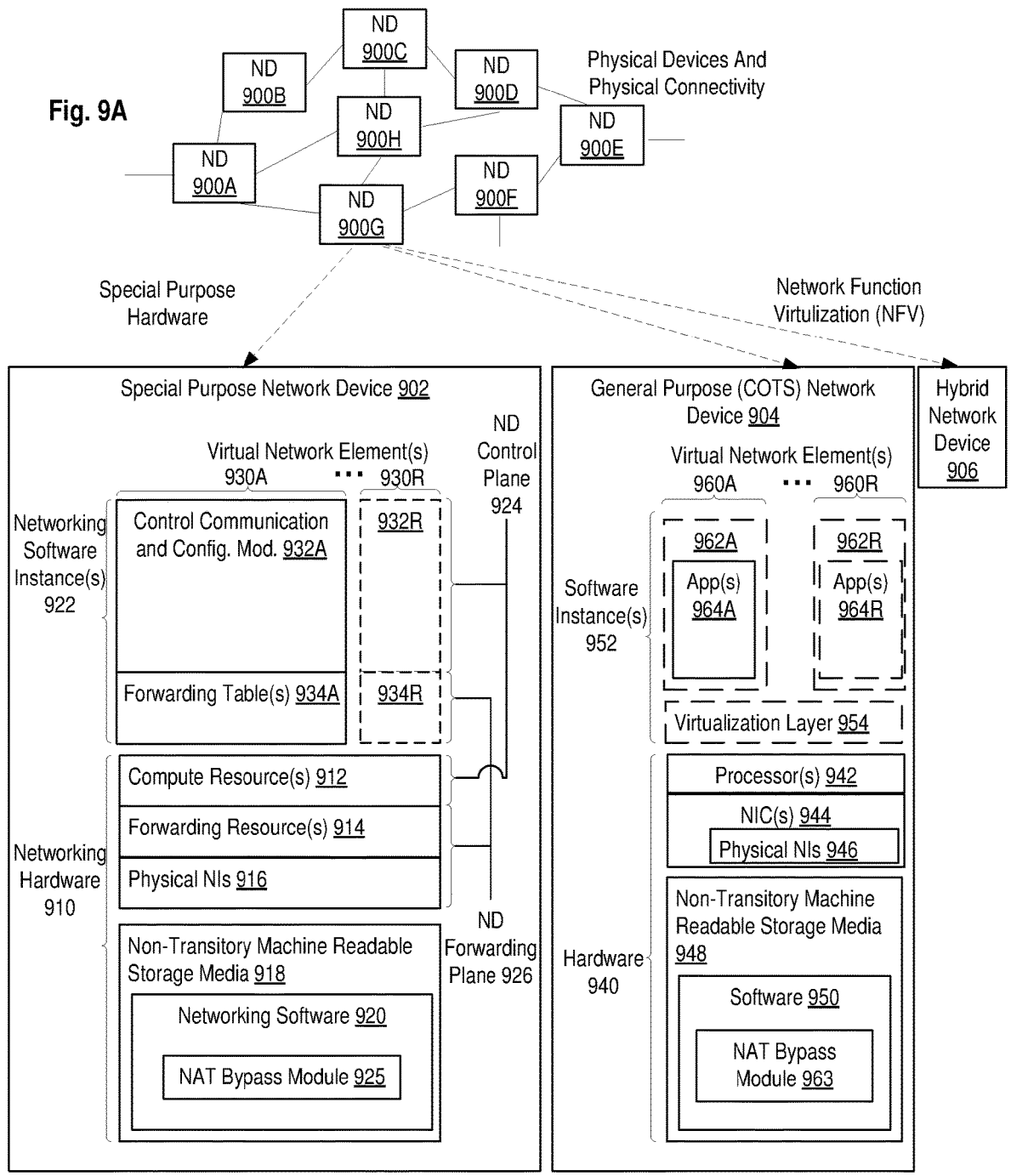
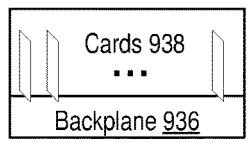

Distributed Approach 972

Centralized Approach (SDN) 974

Fig. 9F  Single VNE 970T

EFFICIENT NAT IN SDN NETWORK

CROSS-REFERENCE TO RELATED APPLICATIONS

This application is a national stage of International Application No. PCT/IB2016/053991, filed Jul. 1, 2016, which is hereby incorporated by reference.

TECHNICAL FIELD

Embodiments of the invention relate to the field of communication networks, and more specifically, to providing efficient network address translation (NAT) in a Software Defined Networking (SDN) network.

BACKGROUND

Software Defined Networking (SDN) is an approach to computer networking that employs a split architecture network in which the forwarding (data) plane is decoupled from the control plane. The use of a split architecture network simplifies the network devices (e.g., switches) implementing the forwarding plane by shifting the intelligence of the network into one or more controllers that oversee the switches. SDN facilitates rapid and open innovation at the network layer by providing a programmable network infrastructure.

OpenFlow is a protocol that enables controllers and switches in an SDN network to communicate with each other. OpenFlow enables dynamic programming of flow control policies in the network.

In telecommunications networks for mobile devices, subscriber traffic typically traverses multiple network functions. One of the most common network functions is network address translation (NAT). NAT is a service that translates private Internet Protocol (IP) addresses into public IP addresses, and vice versa. NAT is typically used when subscribers access the Internet.

Currently, many Internet destinations are addressed using an IP version 4 (IPv4) address. In order for a subscriber (e.g., mobile subscriber) to access an Internet destination, the subscriber must be assigned a unique public IP address. However, the IPv4 addressing scheme does not provide a sufficient number of publicly routable addresses to provide a distinct IP address to every Internet device or service.

The IP address space is managed by the Internet Assigned Numbers Authority (IANA) globally, and by five regional Internet registries (RIR) that are responsible for assigning IP addresses to end users and local Internet registries (e.g., Internet service providers (ISPs)) in their respective designated territories. Top-level exhaustion of IPv4 addresses occurred on Jan. 31, 2011.

Since public IPv4 addresses are in short supply, subscribers cannot be assigned permanent public IPv4 addresses. NAT can be used to help mitigate the shortage of IPv4 addresses. A NAT device can be configured with a pool of public IPv4 addresses. When a subscriber wishes to access the Internet, the NAT device can dynamically assign a public IPv4 address from the pool to the subscriber. This IPv4 address allows the subscriber to setup a session with an Internet destination. Once the Internet session is over, the IPv4 address is returned to the pool.

In conventional SDN networks, all packets belonging to a subscriber flow in the data plane that requires NAT service need to traverse a NAT device. This results in additional packet processing latency due to latency introduced from buffering and copying packets at both the NAT device and the switches. This latency is in addition to the processing latency of performing the actual NAT on the packets.

SUMMARY

A method is implemented by a control plane device in a Software Defined Networking (SDN) network to configure a data plane device in the SDN network to perform network address translation (NAT) for a flow so that the flow can bypass a NAT device. The method includes receiving a translation rule for the flow from the NAT device, configuring the data plane device to steer the flow such that the flow bypasses the NAT device, configuring the data plane device to perform NAT for the flow according to the translation rule for the flow, and transmitting an indication to the NAT device that the flow is to bypass the NAT device.

A network device is configured to function as a control plane device in a Software Defined Networking (SDN) network to configure a data plane device in the SDN network to perform network address translation (NAT) for a flow so that the flow can bypass a NAT device. The network device includes a set of one or more processors and a non-transitory machine-readable storage medium having stored therein a NAT bypass module. The NAT bypass module, when executed by the set of one or more processors, causes the network device to receive a translation rule for the flow from the NAT device, configure the data plane device to steer the flow such that the flow bypasses the NAT device, configure the data plane device to perform NAT for the flow according to the translation rule for the flow, and transmit an indication to the NAT device that the flow is to bypass the NAT device.

A non-transitory machine-readable medium has computer code stored therein, which when executed by a set of one or more processors of a network device functioning as a control plane device in a Software Defined Networking (SDN) network, causes the network device to perform operations for configuring a data plane device in the SDN network to perform network address translation (NAT) for a flow so that the flow can bypass a NAT device. The operations include receiving a translation rule for the flow from the NAT device, configuring the data plane device to steer the flow such that the flow bypasses the NAT device, configuring the data plane device to perform NAT for the flow according to the translation rule for the flow, and transmitting an indication to the NAT device that the flow is to bypass the NAT device.

A method is implemented by a network address translation (NAT) device to cause a flow in a Software Defined Networking (SDN) network to bypass the NAT device. The NAT device is communicatively coupled to a control plane device in the SDN network. The method includes providing a translation rule for the flow to the control plane device, receiving an indication from the control plane device that the flow is to bypass the NAT device, and disabling timeout processing for the flow in response to receiving the indication that the flow is to bypass the NAT device.

A network device is configured to function as a network address translation (NAT) device to cause a flow in a Software Defined Networking (SDN) network to bypass the NAT device. The NAT device is communicatively coupled to a control plane device in the SDN network. The network device includes a set of one or more processors and a non-transitory machine-readable storage medium having stored therein a NAT bypass module. The NAT bypass module, when executed by the set of one or more processors, causes the network device to provide a translation rule for the flow to the control plane device, receive an indication from the control plane device that the flow is to bypass the NAT device, and disable timeout processing for the flow in response to receiving the indication that the flow is to bypass the NAT device.

A non-transitory machine-readable medium has computer code stored therein, which when executed by a set of one or more processors of a network device functioning as a network address translation (NAT) device, causes the network device to perform operations for causing a flow in a Software Defined Networking (SDN) network to bypass the NAT device. The NAT device is communicatively coupled to a control plane device in the SDN network. The operations include providing a translation rule for the flow to the control plane device, receiving an indication from the control plane device that the flow is to bypass the NAT device, and disabling timeout processing for the flow in response to receiving the indication that the flow is to bypass the NAT device.

BRIEF DESCRIPTION OF THE DRAWINGS

The invention may best be understood by referring to the following description and accompanying drawings that are used to illustrate embodiments of the invention. In the drawings:

FIG. 9A illustrates connectivity between network devices (NDs) within an exemplary network, as well as three exemplary implementations of the NDs, according to some embodiments.

FIG. 9B illustrates an exemplary way to implement a special-purpose network device, according to some embodiments.

FIG. 9F illustrates a case where multiple VNEs are implemented on different NDs and are coupled to each other, and where a centralized control plane has abstracted these multiple VNEs such that they appear as a single VNE within one of the virtual networks, according to some embodiments.

DETAILED DESCRIPTION

Figure 1:
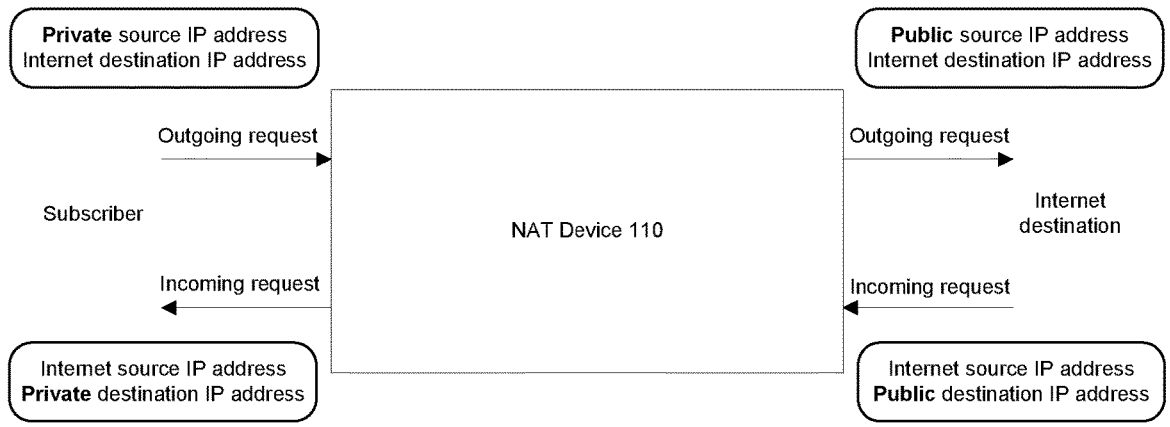
FIG. 1 is a diagram that illustrates a NAT service provided by a NAT device, according to some embodiments.

The following description describes methods and apparatus for providing efficient network address translation (NAT) in a Software Defined Networking (SDN) network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 1 is a diagram that illustrates a NAT service provided by a NAT device, according to some embodiments. An outgoing request from a subscriber to an Internet destination includes a private source IP address (of the subscriber) and an Internet destination IP address. The NAT device 110 translates the private source IP address in the outgoing request into a public source IP address. The public source IP address is a publicly routable IP address that the Internet destination can use to reach the subscriber. In the other direction, an incoming request from an Internet destination to the subscriber includes the Internet source IP address and a public destination IP address (of the subscriber). The NAT device 110 translates the public destination IP address in the incoming request into a private destination IP address (of the subscriber) so that the request can be forwarded to the subscriber.

NAT with port number (NAT-p) is a variation of NAT where a single public IPv4 address can be shared by multiple subscribers. This is made possible due to: 1) most Internet traffic uses Transmission Control Protocol (TCP) or User Datagram Protocol (UDP), which both utilize the concept of ports; 2) a TCP or UDP session is uniquely identified not only by source IP address and destination IP address, but by a 5-tuple that includes port numbers (e.g., 5-tuple includes source IP address, destination IP address, protocol (e.g., TCP or UDP), source port number, and destination port number); and 3) for most sessions, the client port number is randomly chosen. Based on the above, different subscribers can be assigned different port numbers and these subscribers can share a single public IP address. For the sake of clarity, the descriptions provided herein assume a one-to-one mapping of private IP addresses to public IP addresses. However, it should be understood that the techniques described herein are also applicable to NAT-p as well.

In conventional SDN networks, all packets belonging to a subscriber flow in the data plane that requires NAT service need to traverse a NAT device 110. This results in additional packet processing latency due to latency introduced from buffering and copying packets at both the NAT device 110 and the switches. This latency is in addition to the processing latency of performing the actual NAT on the packets. In order to reduce this latency, much effort is taken to place NAT devices 110 close to the traffic source. The latency is even more pronounced when network functions are virtualized because virtualization adds to the latency since the packets need to traverse virtualized components. An example of an NFV infrastructure that provides a virtual NAT service is described with reference to FIG. 2.

Figure 2:
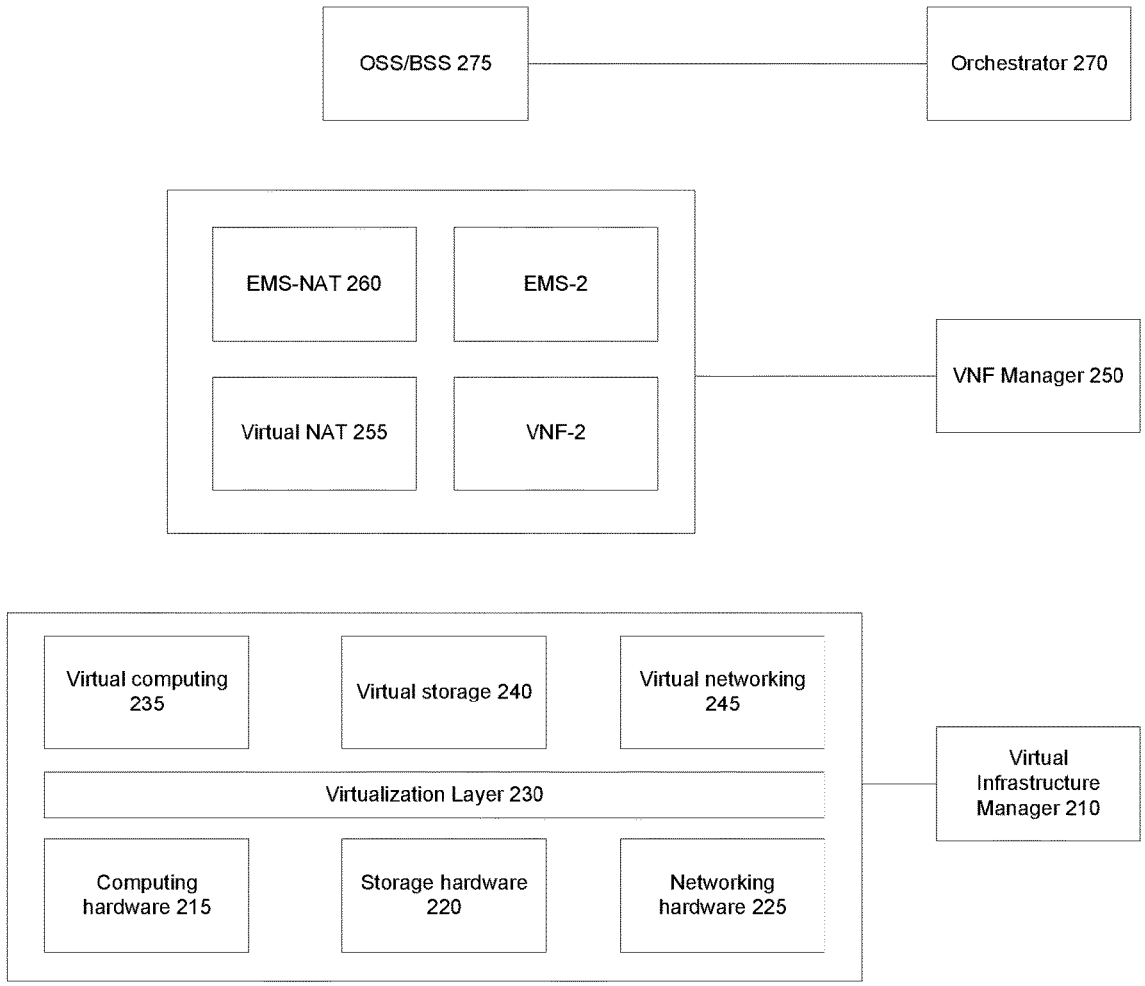
FIG. 2 is a block diagram of an NFV infrastructure that provides a virtual NAT service, according to some embodiments.

FIG. 2 is a block diagram of an NFV infrastructure that provides a virtual NAT service, according to some embodiments. The NFV infrastructure includes the hardware and software components that build up the environment in which VNFs are deployed, managed, and executed. In one embodiment, the NFV infrastructure includes a virtual infrastructure manager 210, a VNF manager 250, and an orchestrator 270.

The virtual infrastructure manager 210 is responsible for managing the hardware resources and the virtualization of the hardware resources. The hardware resources may include computing hardware 215, storage hardware 220, and networking hardware 225. A virtualization layer 230 (e.g., a hypervisor) abstracts and virtualizes the hardware resources into virtual resources and provides these virtual resources to the VNFs. The virtual resources may include virtual computing 235, virtual storage 240, and virtual networking 245.

The VNF manager 250 is responsible for managing VNFs (e.g., instantiating, updating, scaling, and terminating VNFs). A VNF is a virtualization of a network function. Examples of network functions that can be virtualized as a VNF include NAT, firewalling, and intrusion detection. In this example, the VNF manager 250 manages a virtual NAT 255 and a second VNF (designated as "VNF-2"), which can be any type of VNF. The VNF manager 250 can manage any number of VNFs. An element management system (EMS) for the virtual NAT 255 (designated as "EMS-NAT 260") manages the virtual NAT 255. Another EMS (designated as "EMS-2") manages VFN-2. Each EMS is responsible for managing the fault, configuration, accounting, performance, and security management of its corresponding VNF.

The orchestrator 270 is responsible for the orchestration and management of the NFV infrastructure and software resources. The Operations Support Systems (OSS)/Business Support Systems (BSS) support various end-to-end telecommunication services. As used herein, the term "NAT device" may refer to a network device that provides virtualized or non-virtualized NAT service.

NAT devices 110 typically generate translation rules for a flow based on one or more factors/policies such as the pool of public IPv4 addresses that are available, whether the flow originates from the inside (e.g., within a domain where private IP addresses are used) and is destined for the Internet, whether the flow originates from the Internet and is destined for the inside, and whether static mapping or dynamic mapping is utilized. However, once the initial packet belonging to a new flow is processed by the NAT device 110, the translation rule for that flow is fixed. In one embodiment, the translation rule for a flow can be summarized as follows:

| Flow origination | Translation rules |
|---|---|
| Flow originated inside (e.g., in client-server scenario where server is hosted in the Internet). This is also referred to as SNAT (source NAT). | 1. Translate source of IP packet that are travelling from inside to Internet<br>2. Translate destination of IP packet that are travelling from Internet to inside |
| Flow originated from the Internet (e.g., in client-server scenario where server is hosted inside (such as enterprise mail server accessible from the Internet)). This is also referred to as DNAT (destination NAT). | 1. Translate the source of IP packet that are travelling from Internet to inside<br>2. Translate the destination of IP packets that are travelling from inside to Internet |

According to some embodiments, once a NAT device 110 generates a translation rule for a flow, this translation rule is provided to an SDN controller. The SDN controller then configures a switch managed by the SDN controller to steer the flow such that the flow bypasses the NAT device 110. The SDN controller also configures the switch to perform NAT for the flow at the switch according to the translation rule for the flow received from the NAT device 110. By steering the flow such that it bypasses the NAT device 110 and performing NAT at the switch itself (instead of at the NAT device 110), latency for all but the first packet of the flow is reduced since subsequent packets belonging to the flow no longer need to traverse the NAT device 110.

A NAT device 110 typically maintains a timeout timer for flows, where a flow is timed out if a packet belonging to the flow is not received for a period of time. When a flow is timed out, the NAT device 110 may release resources allocated for the flow (e.g., a public IP address). However, if a flow bypasses the NAT device 110, the NAT device 110 may erroneously determine that the flow has timed out after a period of time elapses. In order to address this scenario, according to some embodiments, once the switch is configured to steer the flow such that the flow bypasses the NAT device 110, the SDN controller transmits an indication to the NAT device 110 that the flow is to bypass the NAT device 110. Based on receiving this indication, the NAT device 110 can disable timeout processing for the flow. This way, the NAT device 110 will not prematurely release the resources allocated for the flow. When the SDN controller determines that the flow is terminated, it can transmit an indication to the NAT device 110 that the flow is terminated. Based on receiving this indication, the NAT device 110 can release the resources allocated for the flow.

According to some embodiments, NAT bypass can be selectively provided for certain flows such as elephant flows. Elephant flows are large flows with long durations (what is considered a large flow and a long duration can be defined by a network operator or other entity). It has been shown that a majority of packets in datacenters belong to elephant flows. In one embodiment, a NAT device 110 transmits an indication of the approximate size and duration of the flow to the SDN controller. For example, the NAT device 110 transmits an indication of whether the flow is an elephant flow or not. The SDN controller can use this indication to determine whether flow should bypass the NAT device 110 or not.

Figure 3:
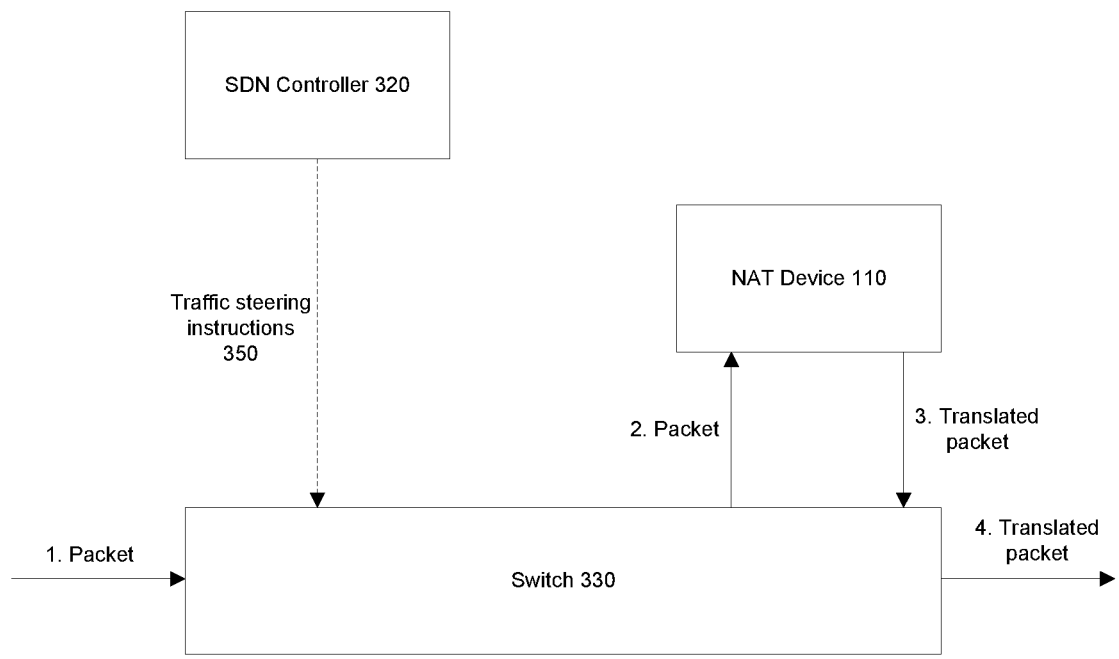
FIG. 3 is a diagram illustrating initial packet processing operations in a network in which NAT bypass for a flow can be implemented, according to some embodiments.

FIG. 3 is a diagram illustrating initial packet processing operations in a network in which NAT bypass for a flow can be implemented, according to some embodiments. The network includes an SDN controller 320, a NAT device 110, and a switch 330 that is managed by the SDN controller 320.

In one embodiment, the SDN controller 320 manages the switch 330 using OpenFlow or another type of communications protocol that allows communication between an SDN controller 320 and a switch 330 in an SDN network. The switch 330 is initially configured to steer the flow to the NAT device 110 so that the NAT device 110 can perform NAT for the flow. In one embodiment, the SDN controller 320 may have configured the switch 330 to steer the flow to the NAT device 110 by transmitting traffic steering instructions 350 to the switch 330. Packet processing operations for an initial packet belonging to the flow will now be described with reference to the diagram. At operation 1, the switch 330 receives the initial packet belonging to the flow. At operation 2, the switch 330 transmits the packet to the NAT device 110 (e.g., according to the traffic steering instructions 350 that it received from the SDN controller 320). The NAT device 110 performs NAT on the packet according to a translation rule for the flow maintained by the NAT device 110 (e.g., translates private IP address into public IP address or vice versa). At operation 3, the NAT device 110 transmits the translated packet back to the switch 330. At operation 4, the switch 330 transmits the translated packet towards its intended destination.

The NAT device 110 may maintain a translation table for storing information regarding one or more translation rules. Each entry in the translation table may represent a translation rule. An entry for a translation rule may include an interface field, a flow identification field, a translate field, and a field value field. The interface field may be used to indicate the interface on which a packet was received. The interface on which a packet was received can be used to identify whether the packet is traveling from the inside to the Internet or from the Internet to the inside. In one embodiment, the interface can be indicated in the interface field as a Virtual Local Area Network (VLAN) or Virtual Private Network (VPN) identifier.

The flow identification field may be used to indicate one or more attributes that identify a flow. In one embodiment, a flow is identified based on the 5-tuple of source IP address, destination IP address, protocol, source port, and destination port.

The translate field may be used to indicate the field in a packet that is to be translated. For example, the field in the packet that is to be translated can be the source IP address field or the destination IP address field.

The field value field may be used to indicate the translated value. For example, the translated value can be a translated IP address.

An exemplary translation table is provided below. The exemplary translation table maintains information regarding a bi-directional translation rule for a flow originated from inside that is destined to the Internet (e.g., SNAT).

| Interface | Flow identification | Translate field | Field value |
|---|---|---|---|
| VPN1 | Source-IP - 10.1.1.1<br>Destination-IP - 17.1.1.1<br>Protocol - TCP<br>Source-port - 5123<br>Destination-port - 80 | Source-IP | 11.1.1.1 |
| Internet | Source-IP - 17.1.1.1<br>Destination-IP - 11.1.1.1<br>Protocol - TCP<br>Source-port - 80<br>Destination-port - 5123 | Destination-IP | 10.1.1.1 |

According to the first entry in the translation table, the source IP address of a packet (belonging to the flow indicated in the flow identification field) traveling from a network device on the inside to an Internet destination is translated from 10.1.1.1 to 11.1.1.1. According to the second entry in the translation table, the destination IP address of a packet (belonging to the flow indicated in the flow identification field) traveling from the Internet destination to the network device on the inside is translated from 11.1.1.1 to 10.1.1.1.

Figure 4:
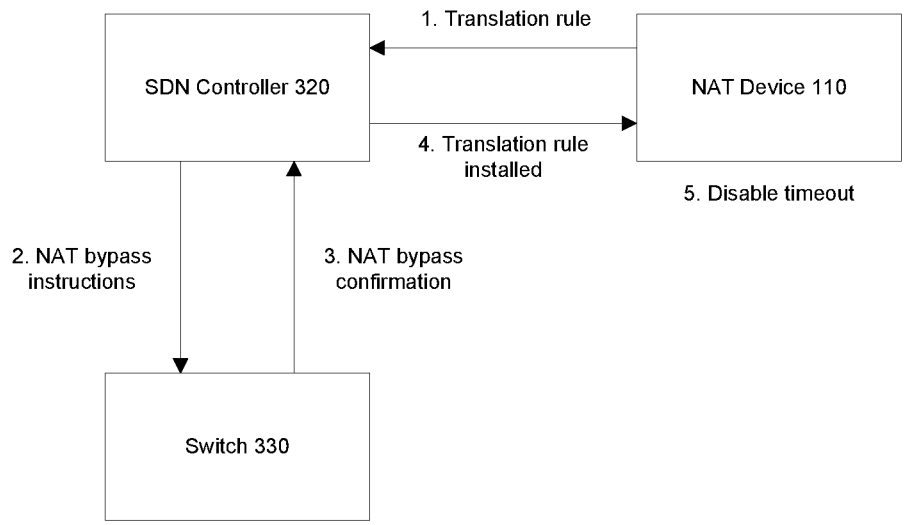
FIG. 4 is a diagram illustrating operations for configuring NAT bypass for a flow, according to some embodiments.

FIG. 4 is a diagram illustrating operations for configuring NAT bypass for a flow, according to some embodiments. At operation 1, a NAT device 110 provides a translation rule for the flow to an SDN controller 320. At operation 2, the SDN controller 320 configures a switch 330 managed by the SDN controller 320 to steer the flow such that the flow bypasses the NAT device 110 and to perform NAT for the flow according to the translation rule for the flow (designated as "NAT bypass instructions"). At operation 3, the switch 330 transmits an indication to the SDN controller 320 that NAT bypass for the flow has been configured (designated as "NAT bypass confirmation"). At operation 4, the SDN controller 320 transmits an indication to the NAT device 110 that the flow is to bypass the NAT device 110 (designated as "translation rule installed"). At operation 5, the NAT device 110 disables timeout processing for the flow to prevent the flow from timing out prematurely.

Figure 5:
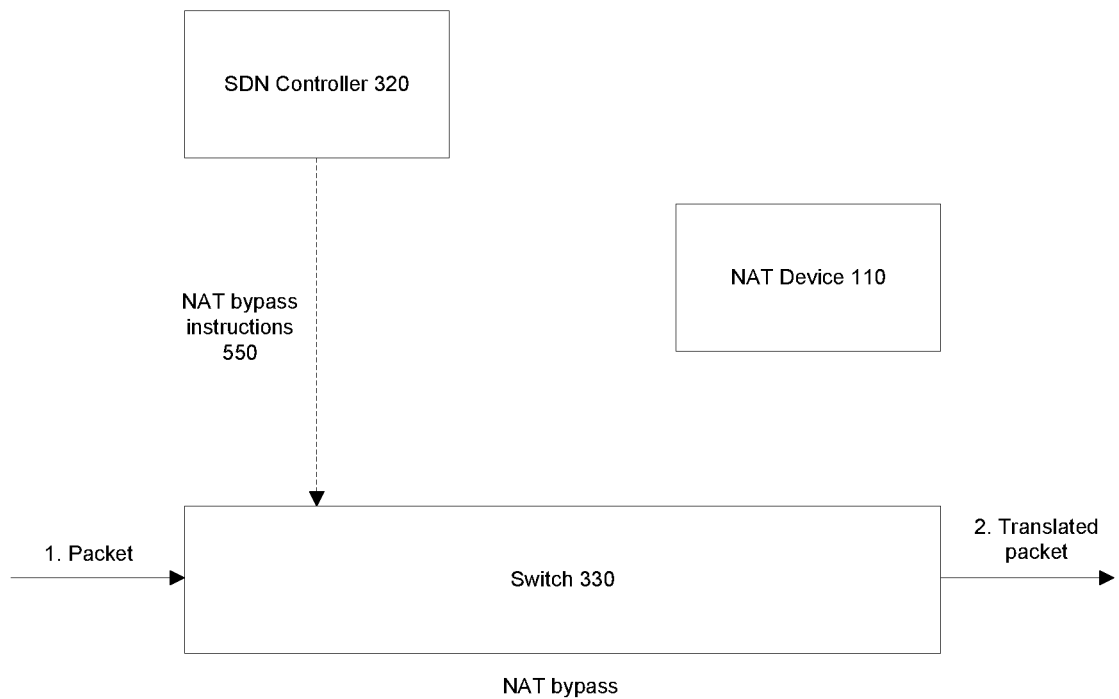
FIG. 5 is a diagram illustrating packet processing operations in a network in which NAT bypass for a flow has been configured, according to some embodiments.

FIG. 5 is a diagram illustrating packet processing operations in a network in which NAT bypass for a flow has been configured, according to some embodiments. The network includes an SDN controller 320, a NAT device 110, and a switch 330 that is managed by the SDN controller 320. The switch 330 is configured to steer the flow such that the flow bypasses the NAT device 110 and to perform NAT for the flow. In one embodiment, the SDN controller 320 may have configured the switch 330 to steer the flow such that the flow bypasses the NAT device 110 and to perform NAT for the flow by transmitting NAT bypass instructions 550 to the switch 330. Packet processing operations for a packet belonging to the flow will now be described with reference to the diagram. At operation 1, the switch 330 receives a packet belonging to the flow. The switch 330 performs NAT on the packet (e.g., translates private IP address into public IP address or vice versa) and at operation 2, the switch 330 transmits the translated packet towards its intended destination (such that the translated packet does not traverse the NAT device 110). As such, the flow bypasses the NAT device 110. As a result, packet processing performance is improved since the flow no longer needs to traverse the NAT device 110.

Figure 6:
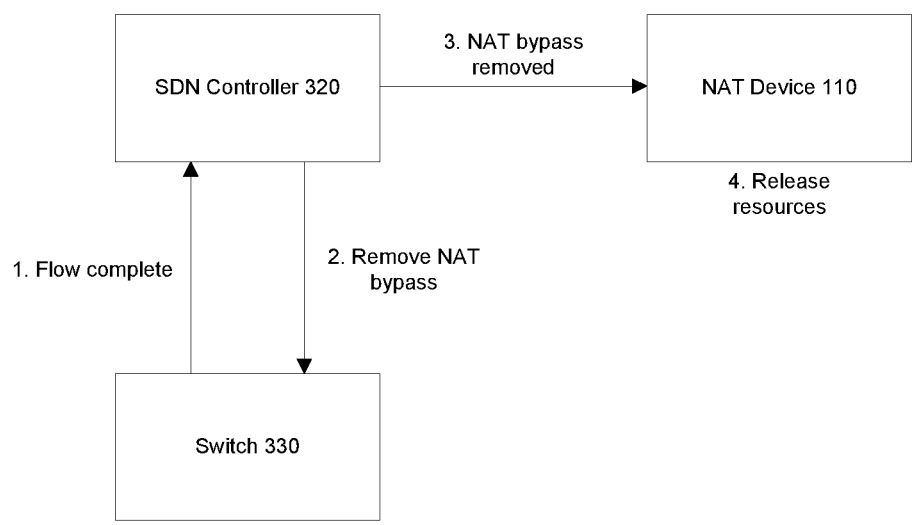
FIG. 6 is a diagram illustrating operations for indicating termination of a flow, according to some embodiments.

FIG. 6 is a diagram illustrating operations for handling termination of a flow, according to some embodiments. At operation 1, a switch 330 informs an SDN controller 320 that the flow is terminated. In TCP, end of session is indicated by a flag in a packet such as the FIN flag. In one embodiment, the switch 330 may have determined that the flow is terminated based on the FIN flag or other flag in a packet belonging to the flow. At operation 2, the SDN controller 320 configures the switch 330 to remove or undo configurations related to NAT bypass for the flow (designated as "remove NAT bypass"). At operation 3, the SDN controller 320 informs the NAT device 110 that NAT bypass for the flow has been removed (designated as "NAT bypass removed"). In response, at operation 4, the NAT device 110 releases resources allocated for the flow (e.g., a public IP address allocated for the flow).

Figure 7:
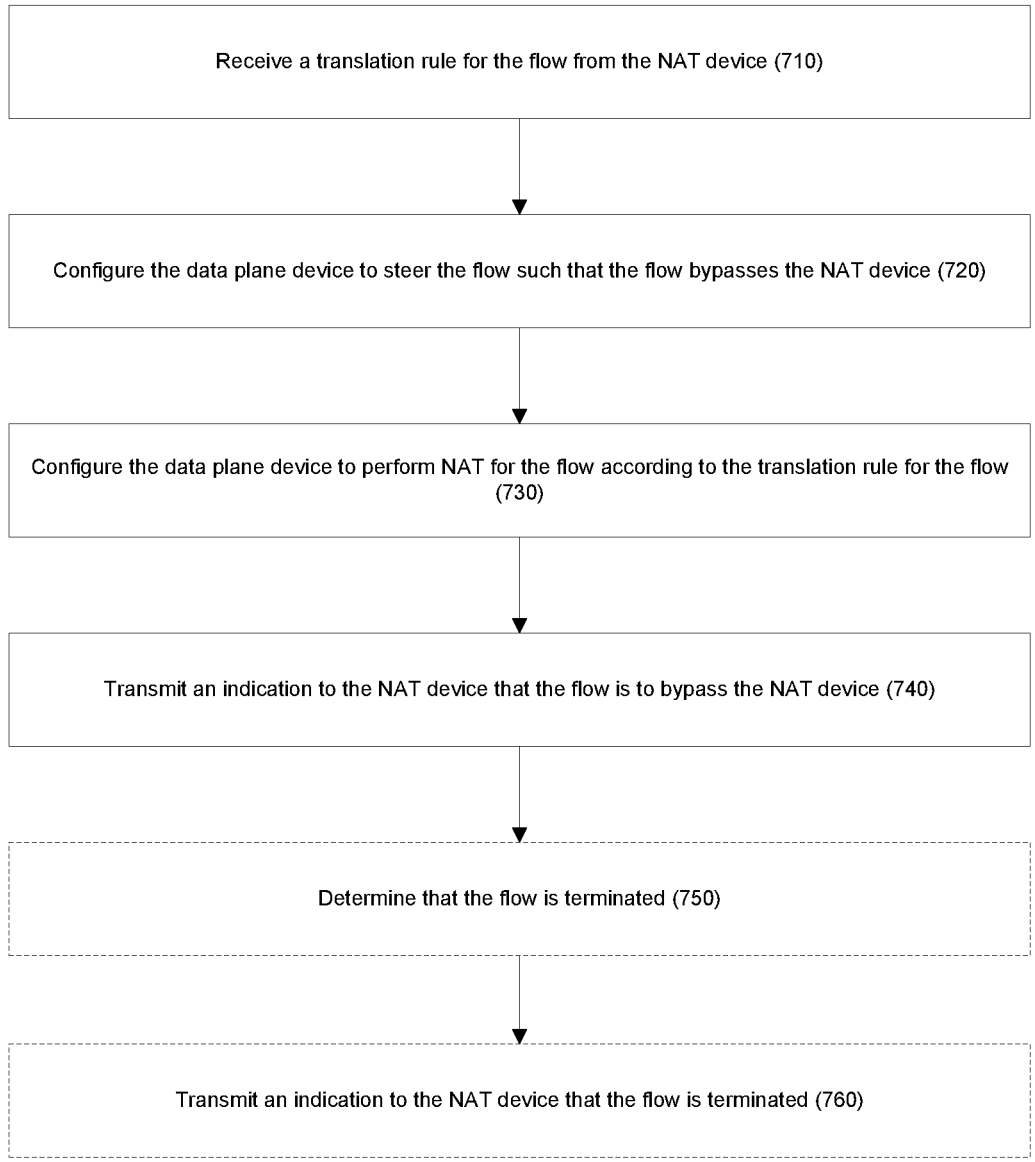
FIG. 7 is a flow diagram of a process for configuring a data plane device in an SDN network to perform NAT for a flow so that the flow can bypass a NAT device, according to some embodiments.

FIG. 7 is a flow diagram of a process for configuring a data plane device in an SDN network to perform NAT for a flow so that the flow can bypass a NAT device, according to some embodiments. In one embodiment, the process is performed by a control plane device in the SDN network (e.g., SDN controller 320) that manages the data plane device (e.g., switch 330). The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment, the process is initiated when the control plane device receives a translation rule for the flow from the NAT device 110 (block 710). In one embodiment, the control plane device also receives an indication of an approximate size and duration of the flow (e.g., whether the flow is an elephant flow) from the NAT device 110. The control plane device may use this information to determine whether the flow is to bypass the NAT device 110 or not. For example, the control plane device may determine that only flows that have an approximate size and/or duration that exceed a predetermined threshold should bypass the NAT device 110. The control plane device may execute the remaining operations of the flow diagram for those flows so that those flows bypass the NAT device 110. In one embodiment, the translation rule for the flow identifies one or more attributes that identify the flow (e.g., 5-tuple of source IP address, destination IP address, protocol, source port, and destination port), a packet field to be translated (e.g., source IP address field or destination IP address field), and a translated value to replace the existing value in the packet field to be translated (e.g., a translated IP address).

In response to receiving the translation rule for the flow, the control plane device configures the data plane device to steer the flow such that the flow bypasses the NAT device 110 (block 720) and configures the data plane device to perform NAT for the flow according to the translation rule for the flow (block 730). In one embodiment, the control plane device may configure the data plane device by programming a flow entry in the data plane device. As an illustrative example, the control plane device may program the following flow entry in the data plane device that has the following match criteria and action:

Match criteria—protocol=TCP; source IP address=4.1.1.3; TCP source port=54692 Action—set field: source IP address=12.12.12.2; set field: TCP source port=49269; output port=port2

The control plane device then transmits an indication to the NAT device 110 that the flow is to bypass the NAT device 110 (block 740). This allows the NAT device 110 to disable timeout processing for the flow.

According to some embodiments, the control plane device may determine that the flow is terminated (block 750). In one embodiment, the determination that the flow is terminated is based on receiving an indication from the data plane device that the flow is terminated. In one embodiment, the data plane device may have determined that the flow is terminated based on seeing a FIN flag in a packet belonging to the flow. In one embodiment, the control plane device may configure the data plane device to transmit an indication to the control plane device that the flow is terminated when the data plane device determines that the flow is terminated. In response to determining that the flow is terminated, the control plane device transmits an indication to the NAT device 110 that the flow is terminated (block 760).

Figure 8:
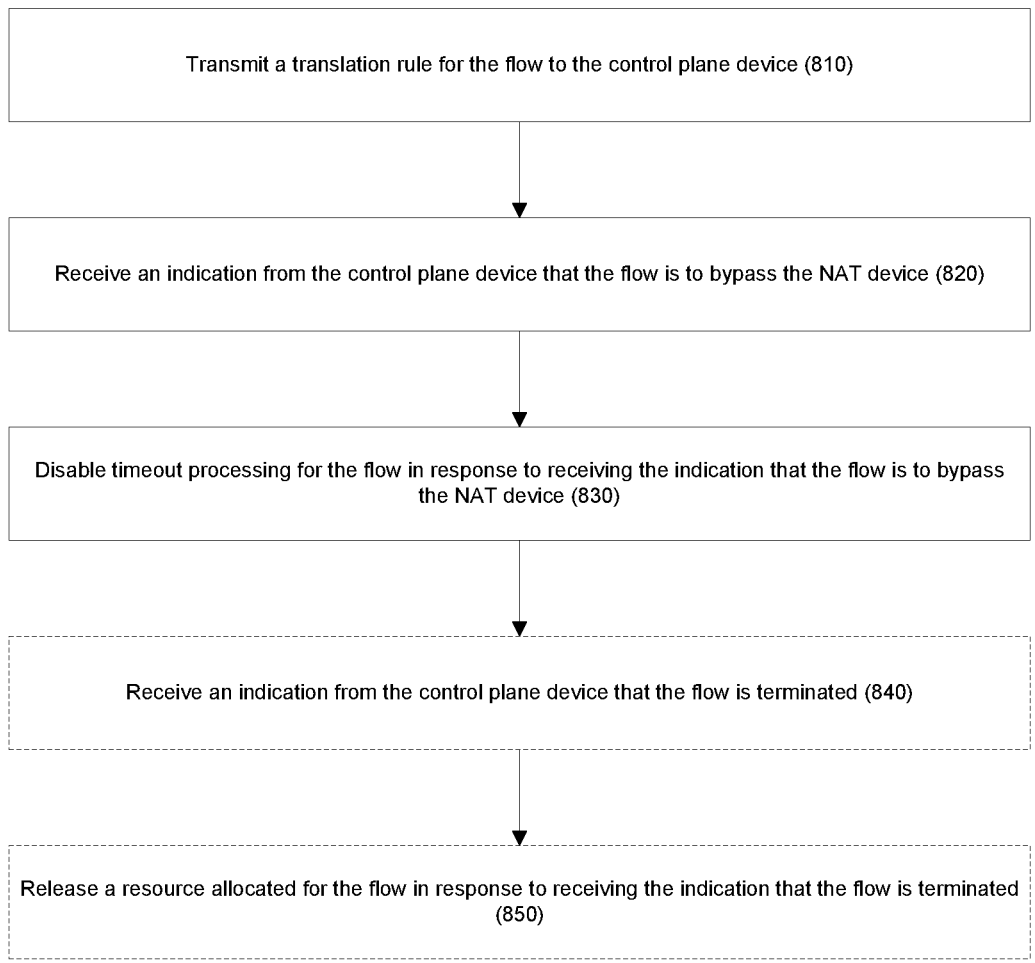
FIG. 8 is a flow diagram of a process for causing a flow in an SDN network to bypass a NAT device, according to some embodiments.

FIG. 8 is a flow diagram of a process for causing a flow in an SDN network to bypass a NAT device, according to some embodiments. In one embodiment, the process is performed by a NAT device 110 that is communicatively coupled to a control plane device (e.g., SDN controller 320) in the SDN network.

In one embodiment, the process is initiated when the NAT device 110 provides a translation rule for the flow to the control plane device (block 810). In one embodiment the NAT device 110 may provide the translation rule for the flow to the control plane device by transmitting the translation rule for the flow to the control plane device. In another embodiment, the NAT device 110 may provide the translation rule for the flow to the control plane device by storing/publishing the translation rule for the flow at a location that the control plane device can access. The control plane device may then retrieve/pull the translation rule for the flow from that location (e.g., the location could be at the NAT device 110 itself or at a separate database/server). The NAT device 110 may subsequently receive an indication from the control plane device that the flow is to bypass the NAT device 110 (e.g., if the control plane device successfully configures the data plane of the SDN network (e.g., a switch 330) to steer the flow such that the flow bypasses the NAT device 110) (block 820). In response, the NAT device 110 disables timeout processing for the flow (block 830).

Subsequently, the NAT device 110 may receive an indication from the control plane device that the flow is terminated (block 840). In response, the NAT device 110 may then release a resource allocated for the flow (block 850). In one embodiment, the resource allocated for the flow that is released is a public IP address allocated for the flow or a combination of a public IP address and a port number (e.g., TCP or UDP port number) allocated for the flow (e.g., in the case of NAT-p).

Embodiments described herein thus allow a flow to bypass a NAT device 110. An advantage provided by the embodiments described herein is that the latency of flows that require NAT is reduced, bandwidth consumption (e.g., to and from the NAT device 110) is reduced, and east-west communication in a datacenter is reduced since flows do not need to be steered to a NAT device 110. In the case of transient overload at a NAT device 110, the NAT processing can be offloaded to a data plane device (e.g., switch 330) without disruption to existing connections. The advantages are even more pronounced when NAT bypass is provided for elephant flows.

FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between 900A-900B, 900B-900C, 900C-900D, 900D-900E, 900E-900F, 900F-900G, and 900A-900G, as well as between 900H and each of 900A, 900C, 900D, and 900G. These NDs are physical devices, and the connectivity between these NDs can be wireless or wired (often referred to as a link). An additional line extending from NDs 900A, 900E, and 900F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application-specific integrated-circuits (ASICs) and a special-purpose operating system (OS); and 2) a general purpose network device 904 that uses common off-the-shelf (COTS) processors and a standard OS.

The special-purpose network device 902 includes networking hardware 910 comprising compute resource(s) 912 (which typically include a set of one or more processors), forwarding resource(s) 914 (which typically include one or more ASICs and/or network processors), and physical network interfaces (NIs) 916 (sometimes called physical ports), as well as non-transitory machine readable storage media 918 having stored therein networking software 920. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 900A-H. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

Software 920 can include code such as NAT bypass module 925, which when executed by networking hardware 910, causes the special-purpose network device 902 to perform operations of one or more embodiments of the present invention as part networking software instances 922.

The special-purpose network device 902 is often physically and/or logically considered to include: 1) a ND control plane 924 (sometimes referred to as a control plane) comprising the compute resource(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the compute resource(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein software 950. During operation, the processor(s) 942 execute the software 950 to instantiate one or more sets of one or more applications 964A-R. While one embodiment does not implement virtualization, alternative embodiments may use different forms of virtualization. For example, in one such alternative embodiment the virtualization layer 954 represents the kernel of an operating system (or a shim executing on a base operating system) that allows for the creation of multiple instances 962A-R called software containers that may each be used to execute one (or more) of the sets of applications 964A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 954 represents a hypervisor (sometimes referred to as a virtual machine monitor (VMM)) or a hypervisor executing on top of a host operating system, and each of the sets of applications 964A-R is run on top of a guest operating system within an instance 962A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-R, or as a combination of unikernels and the above-described techniques (e.g., unikernels and virtual machines both run directly on a hypervisor, unikernels and sets of applications that are run in different software containers).

The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual network element(s) 960A-R.

The virtual network element(s) 960A-R perform similar functionality to the virtual network element(s) 930A-R— e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 962A-R to VNEs also apply to embodiments where such a finer level of granularity and/or unikernels are used.

In certain embodiments, the virtualization layer 954 includes a virtual switch that provides similar forwarding services as a physical Ethernet switch. Specifically, this virtual switch forwards traffic between instances 962A-R and the NIC(s) 944, as well as optionally between the instances 962A-R; in addition, this virtual switch may enforce network isolation between the VNEs 960A-R that by policy are not permitted to communicate with each other (e.g., by honoring virtual local area networks (VLANs)).

Software 950 can include code such as NAT bypass module 963, which when executed by processor(s) 942, cause the general purpose network device 904 to perform operations of one or more embodiments of the present invention as part software instances 962A-R.

The third exemplary ND implementation in FIG. 9A is a hybrid network device 906, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 9C:
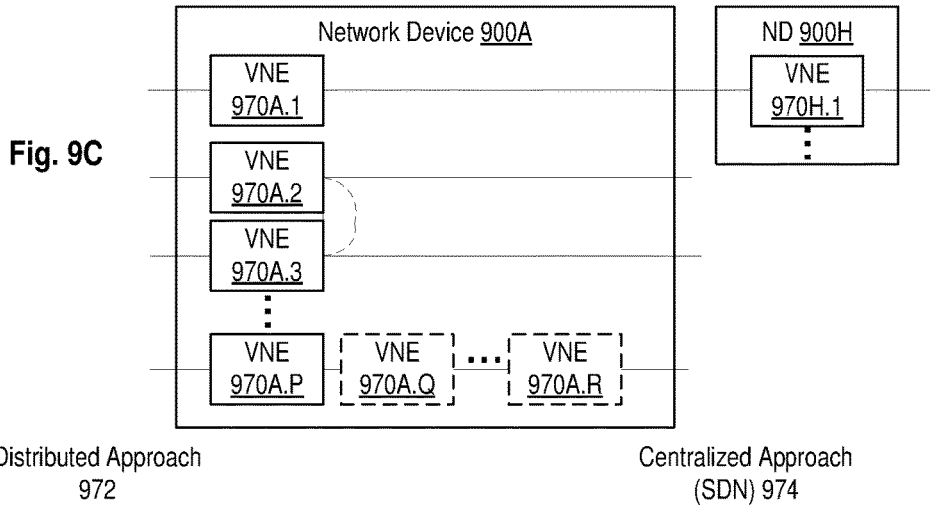
FIG. 9C illustrates various exemplary ways in which virtual network elements (VNEs) may be coupled, according to some embodiments.

FIG. 9C illustrates various exemplary ways in which VNEs may be coupled according to some embodiments of the invention. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the software instances 962A-R may operate as servers; the same would be true for the hybrid network device 906; in the case of the special-purpose network device 902, one or more such servers could also be run on a virtualization layer executed by the compute resource(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 9D:
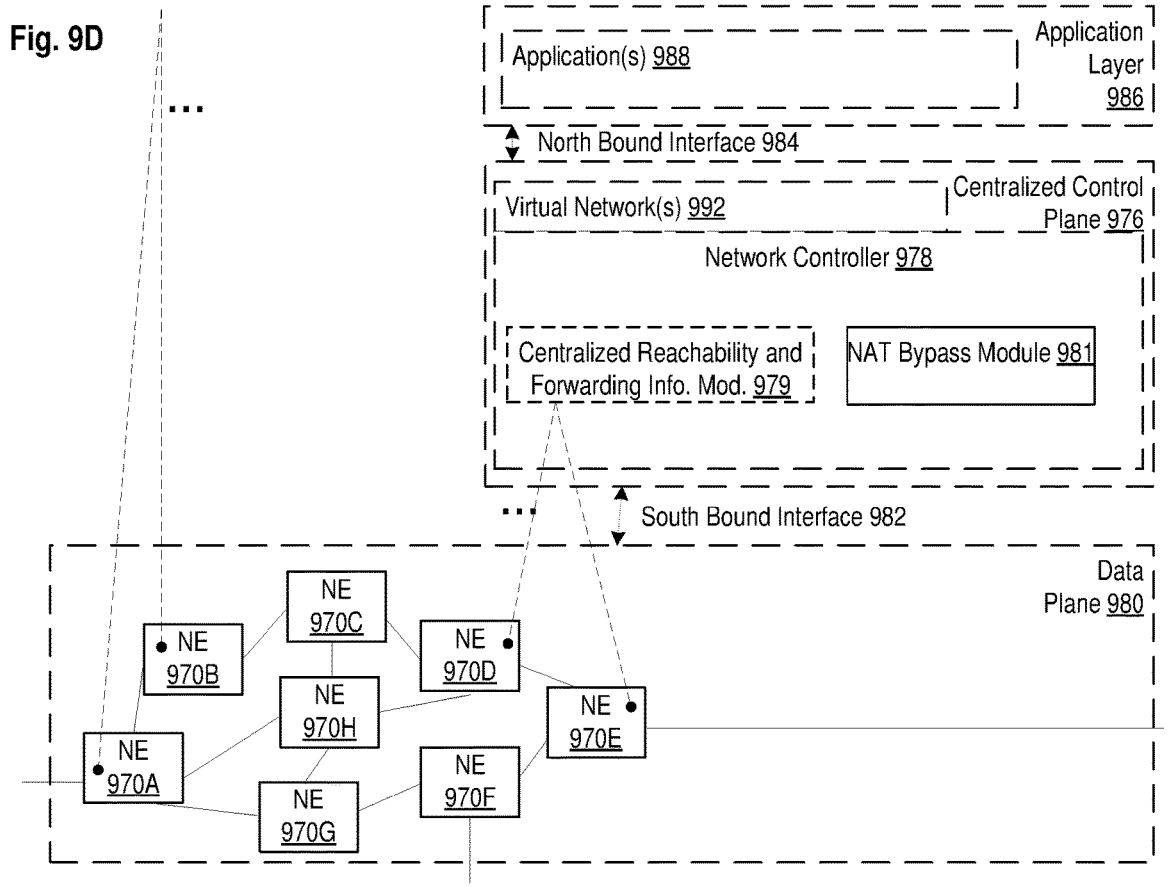
FIG. 9D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments of the invention. Specifically, FIG. 9D illustrates network elements (NEs) 970A-H with the same connectivity as the NDs 900A-H of FIG. 9A.

FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 970A-H (e.g., the compute resource(s) 912 executing the control communication and configuration module(s) 932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs. In one embodiment, the network controller 978 may include a NAT bypass module 981 that when executed by the network controller 978, causes the network controller 978 to perform operations of one or more embodiments described herein above.

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the compute resource(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the invention, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the invention, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 9D shows the distributed approach 972 separate from the centralized approach 974, the effort of network control may be distributed differently or the two combined in certain embodiments of the invention. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 974, but may also be considered a hybrid approach.

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

Figure 9E:
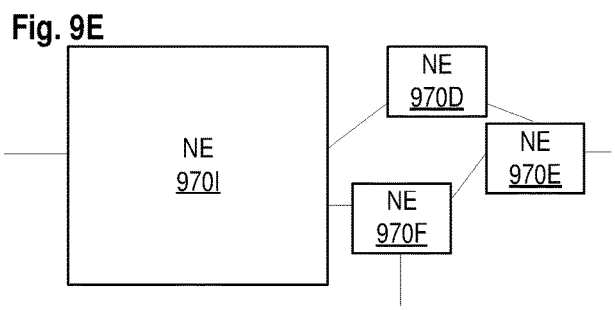
FIG. 9E illustrates the simple case of where each of the NDs implements a single NE, but a centralized control plane has abstracted multiple of the NEs in different NDs into (to represent) a single NE in one of the virtual network(s), according to some embodiments.
Figure 9E:
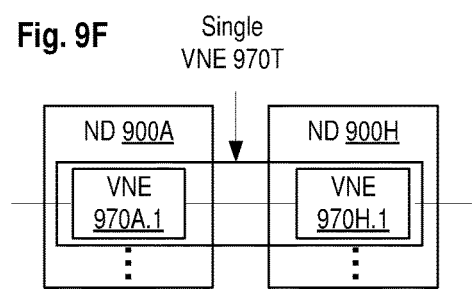

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 9701 in one of the virtual network(s) 992 of FIG. 9D, according to some embodiments of the invention. FIG. 9E shows that in this virtual network, the NE 9701 is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention. Thus, the abstraction of a NE or VNE can span multiple NDs.

While some embodiments of the invention implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
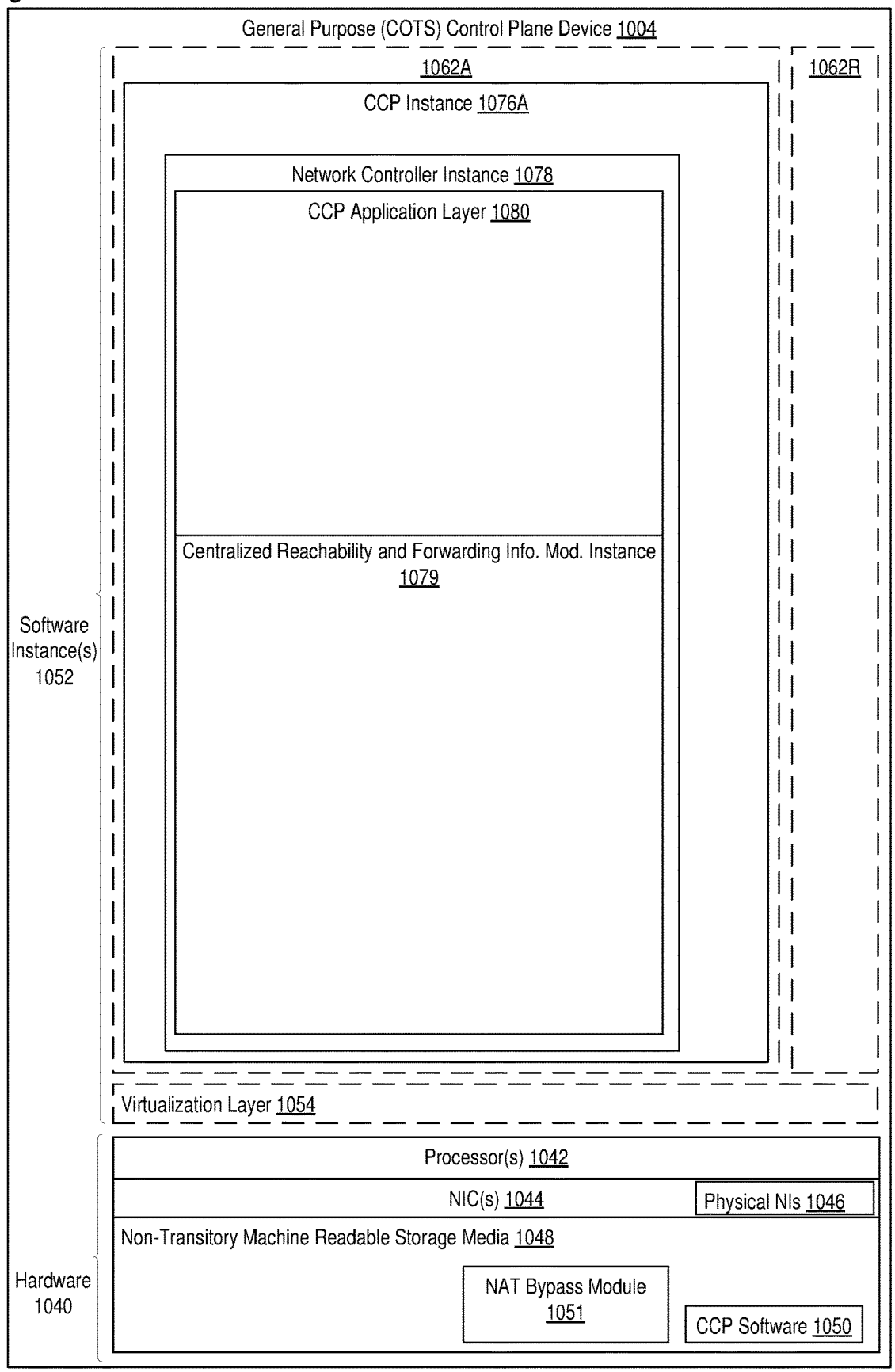
FIG. 10 illustrates a general purpose control plane device with centralized control plane (CCP) software, according to some embodiments.

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 10 illustrates, a general purpose control plane device 1004 including hardware 1040 comprising a set of one or more processor(s) 1042 (which are often COTS processors) and network interface controller(s) 1044 (NICs; also known as network interface cards) (which include physical NIs 1046), as well as non-transitory machine readable storage media 1048 having stored therein centralized control plane (CCP) software 1050 and a NAT bypass module 1051.

In embodiments that use compute virtualization, the processor(s) 1042 typically execute software to instantiate a virtualization layer 1054 (e.g., in one embodiment the virtualization layer 1054 represents the kernel of an operating system (or a shim executing on a base operating system) that allows for the creation of multiple instances 1062A-R called software containers (representing separate user spaces and also called virtualization engines, virtual private servers, or jails) that may each be used to execute a set of one or more applications; in another embodiment the virtualization layer 1054 represents a hypervisor (sometimes referred to as a virtual machine monitor (VMM)) or a hypervisor executing on top of a host operating system, and an application is run on top of a guest operating system within an instance 1062A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1040, directly on a hypervisor represented by virtualization layer 1054 (in which case the unikernel is sometimes described as running within a LibOS virtual machine), or in a software container represented by one of instances 1062A-R). Again, in embodiments where compute virtualization is used, during operation an instance of the CCP software 1050 (illustrated as CCP instance 1076A) is executed (e.g., within the instance 1062A) on the virtualization layer 1054. In embodiments where compute virtualization is not used, the CCP instance 1076A is executed, as a unikernel or on top of a host operating system, on the "bare metal" general purpose control plane device 1004. The instantiation of the CCP instance 1076A, as well as the virtualization layer 1054 and instances 1062A-R if implemented, are collectively referred to as software instance(s) 1052.

In some embodiments, the CCP instance 1076A includes a network controller instance 1078. The network controller instance 1078 includes a centralized reachability and forwarding information module instance 1079 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user-interfaces). At a more abstract level, this CCP application layer 1080 within the centralized control plane 976 works with virtual network view(s) (logical view(s) of the network) and the middleware layer provides the conversion from the virtual networks to the physical view.

The NAT bypass module 1051 can be executed by hardware 1040 to perform operations of one or more embodiments of the present invention as part of software instances 1052.

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method implemented by a control plane device in a Software Defined Networking (SDN) network to configure a data plane device in the SDN network to perform network address translation (NAT) for a flow so that the flow can bypass a NAT device, the method comprising:
   receiving a translation rule for the flow from the NAT device;
   configuring the data plane device to steer the flow such that the flow bypasses the NAT device;
   configuring the data plane device to perform NAT for the flow according to the translation rule for the flow;
   transmitting an indication to the NAT device that the flow is to bypass the NAT device; and
   in response to receiving the indication that the flow is to bypass the NAT device, disabling timeout processing performed by the NAT device.

2. The method of claim 1, further comprising:
   transmitting an indication to the NAT device that the flow is terminated in response to a determination that the flow is terminated.

3. The method of claim 2, wherein the determination that the flow is terminated is based on receiving an indication from the data plane device that the flow is terminated.

4. The method of claim 3, further comprising:
   configuring the data plane device to transmit an indication to the control plane device that the flow is terminated when the data plane device determines that the flow is terminated.

5. The method of claim 1, further comprising:
   receiving an indication of an approximate size and duration of the flow, wherein the indication of the approximate size and duration of the flow is used to determine whether the flow is to bypass the NAT device.

6. The method of claim 1, wherein the translation rule for the flow identifies one or more attributes that identify the flow, a packet field to be translated, and a translated value to replace an existing value in the packet field to be translated.

7. A method implemented by a network address translation (NAT) device to cause a flow in a Software Defined Networking (SDN) network to bypass the NAT device, where the NAT device is communicatively coupled to a control plane device in the SDN network, the method comprising:
   providing a translation rule for the flow to the control plane device;
   receiving an indication from the control plane device that the flow is to bypass the NAT device; and
   disabling timeout processing for the flow in response to receiving the indication that the flow is to bypass the NAT device.

8. The method of claim 7, further comprising:
   receiving an indication from the control plane device that the flow is terminated; and
   releasing a resource allocated for the flow in response to receiving the indication that the flow is terminated.

9. The method of claim 8, wherein the resource allocated for the flow that is released is a public Internet Protocol (IP) address allocated for the flow or a combination of a public IP address and a port number allocated for the flow.

10. A network device configured to function as a control plane device in a Software Defined Networking (SDN) network to configure a data plane device in the SDN network to perform network address translation (NAT) for a flow so that the flow can bypass a NAT device, the network device comprising:
    a set of one or more processors; and
    a non-transitory machine-readable storage medium having stored therein a NAT bypass module, which when executed by the set of one or more processors, causes the network device to receive a translation rule for the flow from the NAT device, configure the data plane device to steer the flow such that the flow bypasses the NAT device, configure the data plane device to perform NAT for the flow according to the translation rule for the flow, transmit an indication to the NAT device that the flow is to bypass the NAT device, and in response to receiving the indication that the flow is to bypass the NAT device, disable time out processing performed by the NAT device.

11. The network device of claim 10, wherein the NAT bypass module, when executed by the set of one or more processors, further causes the network device to transmit an indication to the NAT device that the flow is terminated in response to a determination that the flow is terminated.

12. The network device of claim 11, wherein the determination that the flow is terminated is based on receiving an indication from the data plane device that the flow is terminated.

13. A network device to function as a network address translation (NAT) device to cause a flow in a Software Defined Networking (SDN) network to bypass the NAT device, where the NAT device communicatively coupled to a control plane device in the SDN network, the network device comprising:

a set of one or more processors; and a non-transitory machine-readable storage medium having stored therein a NAT bypass module, which when executed by the set of one or more processors, causes the network device to provide a translation rule for the flow to the control plane device, receive an indication from the control plane device that the flow is to bypass the NAT device, and disable timeout processing for the flow in response to receiving the indication that the flow is to bypass the NAT device.

14. The network device of claim 13, wherein the NAT bypass module, when executed by the set of one or more processors, further causes the network device to receive an indication from the control plane device that the flow is terminated and release a resource allocated for the flow in response to receiving the indication that the flow is terminated.

15. A non-transitory machine-readable medium having computer code stored therein, which when executed by a set of one or more processors of a network device functioning as a control plane device in a Software Defined Networking (SDN) network, causes the network device to perform operations for configuring a data plane device in the SDN network to perform network address translation (NAT) for a flow so that the flow can bypass a NAT device, the operations comprising:

receiving a translation rule for the flow from the NAT device;

configuring the data plane device to steer the flow such that the flow bypasses the NAT device;

configuring the data plane device to perform NAT for the flow according to the translation rule for the flow;

transmitting an indication to the NAT device that the flow is to bypass the NAT device;

in response to receiving the indication that the flow is to bypass the NAT device, disabling timeout processing performed by the NAT device.

16. The non-transitory machine-readable medium of claim 15, wherein the computer code, when executed by the set of one or more processors of the network device, causes the network device to perform further operations comprising:

transmitting an indication to the NAT device that the flow is terminated in response to a determination that the flow is terminated.

17. The non-transitory machine-readable medium of claim 16, wherein the determination that the flow is terminated is based on receiving an indication from the data plane device that the flow is terminated.

18. A non-transitory machine-readable medium having computer code stored therein, which when executed by a set of one or more processors of a network device functioning as a network address translation (NAT) device, causes the network device to perform operations for causing a flow in a Software Defined Networking (SDN) network to bypass the NAT device, where the network device communicatively coupled to a control plane device in the SDN network, the operations comprising:

providing a translation rule for the flow to the control plane device;

receiving an indication from the control plane device that the flow is to bypass the NAT device; and disabling timeout processing for the flow in response to receiving the indication that the flow is to bypass the NAT device.

19. The non-transitory machine-readable medium of claim 18, wherein the computer code, when executed by the set of one or more processors of the network device, causes the network device to perform further operations comprising:

receiving an indication from the control plane device that the flow is terminated; and releasing a resource allocated for the flow in response to receiving the indication that the flow is terminated.

20. The non-transitory machine-readable medium of claim 19, wherein the resource allocated for the flow that is released is a public Internet Protocol (IP) address allocated for the flow or a combination of a public IP address and a port number allocated for the flow.

* * * * *